Patented June 6, 1939

2,161,191

UNITED STATES PATENT OFFICE 2,161,191

ACETYLENIC ALCOHOL

Granville A. Perkins, Charleston, W. Va., assignor to Carbide and Carbon Chemicals Corporation, a corporation of New York No Drawing. Application March 16, 1937, Serial No. 131,186

17 Claims. (Cl. 260—638)

This invention relates to the production of acetylenic alcohols; and more especially it concerns the preparation of tertiary alkyl ethinyl carbinols, such as 3-methylbutinol, its homologues and analogues, by a process providing for the ready recovery of unused reagents.

In accordance with the present invention, acetylene is reacted with a ketone in the presence of an alkali metal salt of a monoalkyl ether of a mono or polyalkylene glycol. The thus-promoted reaction is usually conducted at temperatures below normal room temperature, and preferably between around —10° to 10° C.

In the preferred form of the invention acetylene and a ketone are introduced within and reacted with a solution of an alkali metal salt of a glycol ether in a medium or high-boiling inert solvent for the latter which also is an inert solvent for the alkali metal salt of the acetylenic alcohol produced. Among solvents especially suitable for the purpose may be mentioned the dialkyl ethers of diethylene glycol such as the ethyl butyl ether and the diethyl ether thereof.

Water is then added to the reaction mixture for hydrolyzing the salt of the acetylenic alcohol produced in the reaction. The reaction mixture separates into two layers, the upper one of which contains the major portion of the acetylenic alcohol and is distilled, preferably with water or under vacuum. The fractions containing the acetylenic alcohol are separately recovered. The lower or aqueous layer of the hydrolyzed reaction mixture contains a solution of an alkali metal hydroxide together with some acetylenic alcohol and glycol monoether which may be recovered by distillation.

In conducting the condensation, preferably from 1 to 2 mols of the reaction promoter per mol of the ketone is used.

The ketone may be added by saturating the acetylene with its vapor and then passing the gas into the liquid reagents. However, I usually prefer to first saturate the solution of the alkali metal salt of the glycol monoalkyl ether in the inert solvent with acetylene while maintaining the temperature around —10° to +10° C. To this solution the ketone gradually is added with constant stirring and cooling, while continuing the addition of acetylene, preferably keeping an excess of acetylene present at all times.

The following equations illustrate the type of reactions involved, exemplifying the modification of the process in which acetone and the sodium salt of the monoethyl ether of ethylene glycol are used:

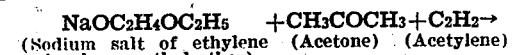
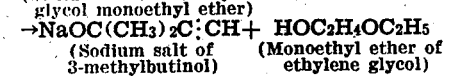
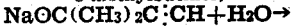
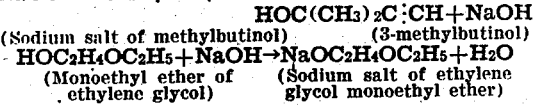

The following examples will serve to illustrate the invention:

Example I

A current of acetylene and acetone vapors was passed into a solution of the sodium salt of the monoethyl ether of ethylene glycol in butyl ethyl ether of diethylene glycol, while agitating the solution and maintaining it at a temperature around —5° C. The acetylene was impregnated with acetone by passing the acetylene through a body of acetone maintained at 35° to 40° C. An excess of acetylene was maintained in the solution over that required to react with the acetone present. After 26 hours, 10 gram-mols of acetone had reacted with 8.47 cubic feet of acetylene. The sodium methylbutinolate produced remained dissolved in the said diethylene glycol butyl ethyl ether, but precipitated in the form of fine crystals, evidently a hydrated form, upon adding a little water. Upon addition of 1 liter of water hydrolysis occurred, accompanied by stratification of the mixture into an upper layer containing methylbutinol and diethylene glycol butyl ethyl ether, and a lower aqueous layer of sodium hydroxide solution containing some methylbutinol.

The upper layer was fractionally distilled at atmospheric pressure, first with water and then dry. The fraction distilling (when dry) between 100° to 105° C. contained 190 grams of 3-methylbutinol. The intermediate fractions distilling at temperatures between the boiling points of acetone and of methylbutinol, and at temperatures between the boiling points of methylbutinol and of mono ethyl ether of ethylene glycol were treated with an excess of a 50% aqueous solution of sodium hydroxide, thereby precipitating the crystalline sodium salt of 3-methylbutinol which was filtered off and hydrolyzed by the addition of sufficient water to convert it to the liquid form, yielding 219 grams of methylbutinol.

A yield of 49% of methylbutinol based upon acetone introduced was obtained.

The solution of the sodium salt of the monoethyl ether of ethylene glycol used in this example was prepared by boiling 450 grams of sodium hydroxide for several hours with 3 liters of ethylene glycol monoethyl ether,—1.5 liters of water and the said ether being boiled off through a fractionating column. The solution was made up to 3 liters with butyl ethyl ether of diethylene glycol, and 1 liter of the monoethyl ether of ethylene glycol was distilled off through the column. A plain still head was then substituted for the column and the distillation continued to 205° C. The remaining solution of the sodium salt of monoethyl ether of ethylene glycol was made up to 2 liters with butyl ethyl ether of diethylene glycol.

The last-named compound may be produced by ethylating the monobutyl ether of diethylene glycol with diethyl sulfate in the presence of soda ash, at temperatures of 135° to 140° C., the said sulfate being added gradually to the mixture of the other reagents. Upon addition of water, stratification occurs. The upper layer is fractionally distilled under a vacuum of around 28 inches of mercury and the ethyl butyl ether of diethylene glycol recovered.

Example II

Acetone and acetylene were reacted in the manner described in Example 1, excepting that 5 mols of acetone were reacted with 6.3 cubic feet of acetylene in the presence of 10 mols of the sodium salt of the monethyl ether of ethylene glycol. The reaction was continued for 3 hours after the acetone had all been added,—a total of 9 hours. Three hundred and fifty grams of 3-methylbutinol,—specific gravity (20/20) of 0.863, and distilling between 100° and 105° C., were obtained. This corresponds to a yield of 83%, based on acetone introduced, and of 90%, based on acetone consumed. Twenty grams of acetone were recovered.

Example III

One liter of a solution in diethyl ether of diethylene glycol of 5.6 mols of the sodium salt of the monoethyl ether of ethylene glycol was cooled to 2° C. in a flask from which the air was removed. Acetylene was passed through the solution until several liters had been absorbed. Thereafter methylisobutyl ketone was slowly added to the solution, keeping the molecular amount of the ketone less than that of the acetylene by continuing the addition of the latter. The addition of acetylene and the ketone was continued until 2.5 mols of the ketone had been added, maintaining the temperature around 4° C. After standing overnight, one liter of water was added, whereupon the liquid stratified, forming two layers which were separated. The upper layer was fractionally distilled under atmospheric pressure with water for the separation therefrom of methylisobutylethinylcarbinol and the monoethyl ether of ethylene glycol, the residue being the diethyl ether of diethylene glycol, the latter two compounds being again available for use in the process.

The lower or aqueous layer was extracted twice with a small proportion of the diethyl ether of diethylene glycol. The resultant extract was slightly acidified with acetic acid and distilled in the presence of water, collecting the upper layer which was again distilled in the presence of water. The top layer of the resultant distillate was separated, dried over potassium carbonate, and fractionally distilled under an absolute pressure of 80 mm. of mercury. The main fraction boiling between 85° and 87° C. contained most (194 grams) of the methylisobutylethinylcarbinol, while the fraction boiling between 78° and 85° C. contained 11 grams thereof. The yield was 67% based on ketone introduced, and 78% based on ketone consumed.

The solution of the sodium salt of the monoethyl ether of ethylene glycol in the diethyl ether of diethylene glycol was prepared by heating 1700 grams of sodium hydroxide and 10 liters of monoethyl ether of ethylene glycol in aqueous solution. After about 50% by volume has distilled off, 3 liters of diethyl ether of diethylene glycol were added and the heating continued under a vacuum ranging from 80 to 100 mm. of mercury, periodically replacing portions distilled away with equivalent portions of the last-named ether until 8 liters thereof had been added. One liter of this solution was used.

Example IV

A solution of the sodium salt of the monoethyl ether of ethylene glycol was prepared by boiling an aqueous solution of sodium hydroxide, containing 12 pounds of the sodium hydroxide until the kettle temperature reached about 150° C. Ten gallons of the monoethyl ether of ethylene glycol were added, and 3 gallons of the same compound in wet state were distilled away. Another 7 gallons of the dry compound were then distilled off under an absolute pressure of 20 to 25 inches of mercury, with gradual addition of 9 gallons of ethyl butyl ether of diethylene glycol, 2 gallons of which were distilled off to remove the excess of the monoethyl ether of ethylene glycol.

The resultant solution was cooled to 5° C., and was saturated with acetylene. Thirteen pounds of acetone then were run in gradually during 5 hours, with continued introduction of acetylene, agitation, and cooling of the mixture. About 60 cubic feet of acetylene reacted.

Six gallons of water containing some monoethyl ether of ethylene glycol were slowly added to the reaction mixture during agitation of the latter. This addition of wet monoethyl ether of ethylene glycol with the water is not necessary, but it preferably was used since it offers a convenient means for drying the wet compound formed in the preparation of the sodium salt of the latter. During addition of the water to the reaction mixture, a crystalline precipitate, apparently a hydrated sodium salt of methylbutinol, formed at first; but this was decomposed by addition of more water, and two liquid layers formed. The upper layer was fractionally distilled under atmospheric pressure for the separate removal therefrom of 3-methylbutinol and the monoethyl ether of ethylene glycol, the residue being the ethyl butyl ether of diethylene glycol. Any slight alkalinity of this layer should be neutralized prior to distillation.

The lower layer is distilled to separate the very small amount of wet methylbutinol it contains, and the residue is aqueous sodium hydroxide suitable for use in the step of making the sodium salt of the said ether. If desired, the wet methylbutinol may be added to the water used in the hydration step, and dried in the subsequent fractional distillation of the hydration products.

In the practice of the invention other salts of the monoalkyl ethers of the glycols may be substituted for the corresponding sodium salts. However, the sodium salts are preferred. The potassium salt of monoethyl ether of ethylene glycol, and the sodium salt of the monomethyl ether of ethylene glycol are less suitable than the sodium salt of the monoethyl ether of ethylene glycol, since the former are much less soluble in the cold diethyl ether of diethylene glycol or other polyalkylene glycol dialkyl ether used as the solvent. Likewise, it is possible to substitute for the hydrolyzable alkali metal salts of the monoalkyl ethers of ethylene glycol, the corresponding salts of the monoalkyl ethers of the polyalklene glycols, including those of the polyethylene glycols and mixed glycols, utilizing in conjunction therewith as solvent in the process a somewhat higher boiling dialkyl ether of a polyglycol. Dry powdered caustic alkali may be employed in the production of the alkali salt of the said glycol ethers used in the process of the invention, though it is commercially convenient to employ aqueous solutions.

Among other ketones suitable for use in the process may be mentioned methyl ethyl ketone, diethyl ketone, dipropyl ketone, methyl amyl ketone, methyl nonyl ketone, acetophenone, and cyclohexanone.

The process of the invention is applicable generally for the production of tertiary alkyl ethinyl carbinols of the type represented by the general formula

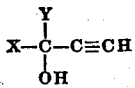

wherein X and Y, respectively, designate the same or different hydrocarbon radicals.

An important advantage attendant the use of this invention resides in the employment of reaction promoters which are relatively inexpensive, are easily produced from compounds now being marketed commercially, and are readily recovered during the later steps of the process for reuse therein.

It will be observed that, as illustrated in the foregoing examples, the acetylenic alcohol produced has a boiling point below the boiling point of either the inert solvent or of the glycol monoether corresponding to the reaction promoter used, as a result of which, upon distillation of the upper liquid stratum formed in the hydrolysis step, the acetylenic alcohol is removable in the vapor phase; and the unvaporized solvent and reaction promoter thus can be used repeatedly in the process without the need for any step for their vaporization or condensation. Even in the event that the solvent or reaction promoter contains small amounts of the acetylenic alcohol, due to failure to remove the last traces of the latter from these reagents, the said alcohol is not lost but is recoverable in the next cycle of operation.

I claim:

1. Process for producing a monohydric acetylenic alcohol, which comprises reacting a ketone and acetylene in the presence of an alkali metal salt of a monoalkyl ether of a glycol, and hydrolyzing the salt of the acetylenic alcohol thus produced.

2. Process for producing a monohydric acetylenic alcohol, which comprises reacting a ketone and acetylene in the presence of an alkali metal salt of a monoalkyl ether of an alkylene glycol, and hydrolyzing the salt of the acetylenic alcohol thus produced.

3. Process for producing a monohydric acetylenic alcohol, which comprises reacting a ketone and acetylene in the presence of an alkali metal salt of a monoalkyl ether of ethylene glycol in solution in a dialkyl ether of a polyalkylene glycol, and hydrolyzing the salt of the acetylenic alcohol thus produced.

4. Process for producing a monohydric acetylenic alcohol, which comprises reacting a ketone and acetylene in the presence of an alkali metal salt of a monoalkyl ether of ethylene glycol in solution in dialkyl ether of a polyethylene glycol, hydrolyzing the salt of the acetylenic alcohol thus produced, and separating from the reaction mixture the said alcohol.

5. Process for producing a monohydric acetylenic alcohol, which comprises reacting a ketone and acetylene in the presence of an alkali metal salt of a monoalkyl ether of ethylene glycol in solution in a dialkyl ether of diethylene glycol, hydrolyzing the salt of the acetylenic alcohol thus produced, and separating from the reaction mixture the said alcohol.

6. Process for producing a tertiary alkyl ethinyl carbinol, which comprises reacting acetylene and an aliphatic ketone in the cold in the presence of an alkali metal salt of a monoalkyl ether of a glycol, in solution in a high-boiling inert solvent for the said salt, hydrolyzing the salt of the alkyl ethinyl carbinol thus produced, and recovering the resultant tertiary alkyl ethinyl carbinol.

7. Process for producing a tertiary alkyl ethinyl carbinol, which comprises reacting acetylene and an aliphatic ketone at a temperature between around −10° and around 10° C., in the presence of an alkali metal salt of a monoalkyl ether of a glycol, in solution in a high-boiling solvent for the said salt, hydrolyzing the salt of the alkyl ethinol carbinol thus produced, and recovering the resultant tertiary alkyl ethinyl carbinol.

8. Process for producing a tertiary alkyl ethinyl carbinol, which comprises reacting acetylene and an aliphatic ketone in the cold in the presence of an alkali metal salt of a mono alkyl ether of ethylene glycol in solution in a dialkyl ether of diethylene glycol, hydrolyzing the salt of the alkyl ethinyl carbinol thus produced, and recovering the resultant tertiary alkali ethinyl carbinol.

9. Process for producing 3-methyl butinol, which comprises reacting acetylene and acetone in the cold in the presence of an alkali metal salt of a monoalkyl ether of ethylene glycol in solution in a dialkyl ether of diethylene glycol, hydrolyzing the resultant alkali metal salt of 3-methyl butinol, and recovering the 3-methyl butinol thus produced.

10. Process for producing methylisobutylethinylcarbinol, which comprises reacting acetylene and methylisobutylketone in the cold in the presence of an alkali metal salt of a monoalkyl ether of ethylene glycol in solution in a dialkyl ether of a polyethylene glycol, hydrolyzing the resultant alkali metal salt of methylisobuytlethinylcarbinol, and recovering the methylisobutylethinylcarbinol thus produced.

11. Process for producing a tertiary alkyl ethinyl carbinol, which comprises introducing acetylene and an aliphatic ketone into a body of a solution of an alkali metal salt of a monoalkyl ether of ethylene glycol in a dialkyl ether of a polyglycol, and regulating the rate of introduction of the ketone and acetylene so as to maintain the molecular amount of acetylene in the reaction mixture in excess of that of the ketone.

12. Process for producing a tertiary alkyl ethinyl carbinol, which comprises introducing acetylene and an aliphatic ketone into a solution of an alkali metal salt of a monoalkyl ether of ethylene glycol in a dialkyl ether of diethyleneglycol, controlling the introduction of the ketone and acetylene so as to maintain the molecular amount of the acetylene in excess of that of the ketone, and maintaining a ratio of ketone to the said alkali metal salt within the range of between 1:1 and 1:2.

13. Process for producing a tertiary alkyl ethinyl carbinol, which comprises introducing a mixture of acetylene and vapors of an aliphatic ketone into a solution of an alkali metal salt of a monoalkyl ether of ethylene glycol in solution in a dialkyl ether of a polyalkylene glycol, controlling the proportions of ketone and acetylene in the said mixture so as to maintain the molecular amount of acetylene in the resultant reaction mixture in excess of that of the ketone, hydrolyzing the sodium salt of the alkyl ethinyl carbinol thus produced, and separately recovering the resultant tertiary alkyl ethinyl carbinol.

14. Process for producing a tertiary alkyl ethinyl carbinol, which comprises introducing a mixture of acetylene and vapors of an aliphatic ketone into a solution of an alkali metal salt of a monoalkyl ether of ethylene glycol in solution in a dialkyl ether of a polyglycol, while maintaining the solution at a low temperature, controlling the proportions of ketone and acetylene in the said mixture so as to maintain the molecular amount of acetylene in the resultant reaction mixture in excess of that of the ketone, hydrolyzing the sodium salt of the alkyl ethinyl carbinol thus produced, and separately recovering the resultant tertiary alkyl ethinyl carbinol.

15. Process for producing a monohydric acetylenic alcohol, which comprises reacting a ketone and acetylene in the presence of a hydrolyzable salt of a glycol monoalkyl ether, and hydrolyzing the salt of the acetylenic alcohol thus produced.

16. Process for producing a monohydric acetylenic alcohol, which comprises reacting a ketone and acetylene in the presence of an alkali metal salt of a glycol monoalkyl ether in solution in an inert solvent, the glycol ether corresponding to the said salt, and the said inert solvent, respectively having boiling points above that of the acetylenic alcohol, hydrolyzing the salt of the acetylenic alcohol thus produced, and separating from the reaction mixture the resultant acetylenic alcohol.

17. Process for producing a monohydric acetylenic alcohol, which comprises introducing successive portions of acetylene and the vapors of an aliphatic ketone into an agitated solution of an alkali metal salt of a monoalkyl ether of a glycol in a high-boiling solvent for said salt and for the corresponding salt of the acetylenic alcohol thus produced, while maintaining the mixture at a temperature substantially below room temperature, hydrolyzing the last-named salt, and separately recovering the resultant acetylenic alcohol.

GRANVILLE A. PERKINS.